United States Patent
Draht et al.

(10) Patent No.: US 11,673,206 B2
(45) Date of Patent: Jun. 13, 2023

(54) WELDING AUXILIARY JOINING PART AND METHOD FOR CONNECTING COMPONENTS BY WAY OF SAID WELDING AUXILIARY JOINING PART

(71) Applicant: BÖLLHOFF VERBINDUNGSTECHNIK GmbH, Bielefeld (DE)

(72) Inventors: Torsten Draht, Schloß Holte-Stukenbrock (DE); Sergej Hartwig-Biglau, Löhne (DE)

(73) Assignee: Böllhoff Verbindungstechnik GmbH, Bielefeld (DE)

(*) Notice: Subject to any disclaimer, the term of this patent is extended or adjusted under 35 U.S.C. 154(b) by 878 days.

(21) Appl. No.: 16/502,152

(22) Filed: Jul. 3, 2019

(65) Prior Publication Data

US 2019/0321908 A1    Oct. 24, 2019

Related U.S. Application Data (62) Division of application No. 14/431,135, filed as application No. PCT/EP2013/069752 on Sep. 23, 2013, now Pat. No. 10,384,295.

(30) Foreign Application Priority Data

Sep. 25, 2012 (DE) .......................... 102012018866.8

(51) Int. Cl.
*B23K 11/20* (2006.01)
*B23K 11/00* (2006.01)
(Continued)

(52) U.S. Cl.
CPC ............. *B23K 11/20* (2013.01); *B21J 15/025* (2013.01); *B21J 15/08* (2013.01);
(Continued)

(58) Field of Classification Search
CPC ..... B21J 15/025; B21J 15/08; B23K 11/0053; B23K 11/0066; B23K 11/11; B23K 11/20;
(Continued)

(56) References Cited

U.S. PATENT DOCUMENTS

| 6,769,595 B2 | 8/2004 | Stol et al. |
| 2005/0133483 A1* | 6/2005 | Hou ........................ B23K 11/20 219/93 |

(Continued)

FOREIGN PATENT DOCUMENTS

| CN | 101890564 A | 11/2010 |
| DE | 102007036416 A1 | 2/2009 |
| DE | 102004025492 A1 | 8/2009 |

OTHER PUBLICATIONS

DE Office Action for DE Application No. 102012018866.8 dated Jan. 31, 2023, (10 pages).

*Primary Examiner* — Dana Ross
*Assistant Examiner* — James F Sims, III
(74) *Attorney, Agent, or Firm* — Reising Ethington P.C.

(57) ABSTRACT

A welding auxiliary joining part is disclosed in the shape of a stud having a head, a shank and a tip. The welding auxiliary joining part is driven in by means of a mechanical-thermal setting method into a component of non- or poorly weldable material. During the driving in, a welding head is created due to mechanical deformation so that the component may be connected subsequently via the welding auxiliary joining part to a further component of weldable material by means of welding.

15 Claims, 7 Drawing Sheets

(51) Int. Cl.
*B23K 11/11* (2006.01)
*B21J 15/08* (2006.01)
*B21J 15/02* (2006.01)
*B23K 103/16* (2006.01)

(52) U.S. Cl.
CPC ...... *B23K 11/0053* (2013.01); *B23K 11/0066* (2013.01); *B23K 11/11* (2013.01); *B23K 2103/16* (2018.08); *Y10T 403/472* (2015.01)

(58) Field of Classification Search
CPC ............ B23K 2103/16; B23K 11/0026; B23K 11/02; B23K 11/115; B23K 11/166; B23K 11/36; B23K 2201/006; B23K 2201/185; B23K 2203/20; Y10T 403/472
See application file for complete search history.

(56) References Cited

U.S. PATENT DOCUMENTS

2005/0161965 A1* 7/2005 Eberlein ................ B23K 11/02
 296/29
2008/0222873 A1* 9/2008 Draht ...................... F16B 19/14
 29/432

* cited by examiner

WELDING AUXILIARY JOINING PART AND METHOD FOR CONNECTING COMPONENTS BY WAY OF SAID WELDING AUXILIARY JOINING PART

1. CROSS REFERENCE TO RELATED APPLICATIONS

This application is a divisional of U.S. patent application Ser. No. 14/431,135 filed Mar. 25, 2015 which is a national phase of PCT/EP2013/069752 filed Sep. 23, 2013 and claims the priority of German patent application DE 102012018866.8, filed on Sep. 25, 2012. The entire contents of these priority applications are incorporated herein by reference.

2. TECHNICAL FIELD

The present invention relates to a method for connecting several components by means of a welding auxiliary joining part and by means of a mechanical-thermal setting-welding-process. By means of this mechanical-thermal setting-welding-process, at least a first component of well or poorly weldable material and at least a second component of well weldable material are connected to each other by means of the welding auxiliary joining part.

3. BACKGROUND

Welding is a well-established method to connect components of weldable material, as for example steel, to each other. Exemplary welding methods are the resistance spot welding and the stud welding, at which two oppositely arranged components are connected to each other selectively or point by point by means of welding. A further welding method is the stud welding with light arc.

Nowadays, in different industrial sectors, components have to be connected to each other which consist of partly non- or poorly weldable material. Nevertheless, welding provides an effective connection method even for these components of non- or poorly weldable material. For this purpose, a welding auxiliary joining part of weldable material is fastened in the component of non- or poorly weldable material. Subsequently, a welding connection between a component of weldable material and the welding auxiliary joining part is produced so that the component of weldable material and the component of non- or poorly weldable material are connected to each other by means of the welding auxiliary joining part. Examples for components of non- or poorly weldable material are aluminum sheets, moldings of plastic or fibre-reinforced plastic, for example carbon fibre-reinforced plastic, to mention only a few examples. The above-described method for example follows from the German patent application DE 100 15 713 A1.

A connection method by means of welding between a component of non- or poorly weldable material and a component of weldable material is described in the German patent application 10 2005 006 253 A1. Here, a stud having a shank and a head of weldable material is inserted into a pre-fabricated hole in the component of non- or poorly weldable material and is subsequently welded to the component of weldable material. For reliably fastening the stud with its shank in the pre-punched portion of the component of non- or poorly weldable material, the shank of the stud is deformed laterally after the welding by means of compression so that a force-fit connection between the shank of the stud and the inner wall of the hole of the component results.

Due to the plurality of method steps, the here described connection method is technically complex and time-intensive.

In the German patent applications DE 10 2004 025 492 A1 and DE 10 2007 036 416 A1, rivets, studs or nails are set as welding auxiliary joining part into components of non- or poorly weldable material, respectively. The tip of the welding auxiliary joining part protrudes from the one side of the component of non- or poorly weldable material and forms a welding spot having a very small contact surface for contacting the opposing component of weldable material. As soon as the welding auxiliary joining part and the component of weldable material are connected to each other, for example by means of resistance welding in the manner of the resistance spot welding or the resistance stud welding, the tip or edge of the welding auxiliary joining part is melted so that a so-called welding lens or weld nugget is formed. Due to the small contact surface between the welding auxiliary joining part and the component of weldable material at the tip or in the edge portion of the welding auxiliary joining part, the contact zone for welding is relatively small. This prolongs the welding procedure or worsens the welding connection due to the small contact surface compared to oppositely arranged components which contact each other in a greater portion. Corresponding to the small contact surface between welding auxiliary joining part and the component of weldable material, the forming weld nugget is small. This affects among others the mechanical loadability as well as the lifetime of the connection produced. Further, and when using a half-hollow punch rivet as welding auxiliary joining part, a waste slug of non- or poorly weldable material is produced. At the subsequent welding, this waste slug is arranged in the welding zone and in the portion of the weld nugget so that the emerging welding connection is affected in its quality due to this contamination.

Further, in DE 10 2004 025 492 A1, it is described as advantageous to mechanically deform the component of weldable material in the contact portion for the later welding by means of the setting procedure of the welding auxiliary joining part in the component of non- or poorly weldable material. Particularly, a tip or an edge of the welding auxiliary joining part enters the component of weldable material or creates a dent or recess in this component of weldable material. This dent shall then facilitate the formation of a sufficiently large weld nugget during the resistance welding between the welding auxiliary joining part and the component of weldable material in the portion of this depression or dent, respectively. For realizing this method, it is, however, necessary to arrange all components to be connected above each other before the welding auxiliary joining part is set. Otherwise, an additional work step is necessary for creating the dent in the component of weldable material and aligning it with respect to the welding auxiliary joining parts already set. This is complex, time intensive and requires further an additional constructive effort for precisely positioning the components to be connected to each other and is limited in the choice of the possible welding methods and the process-sequence.

DE 100 60 390 A1 describes a punch rivet method at which a punch rivet is driven through a first electrically non-conductive material, as for example plastic, by means of an electrode punch and is connected to a second electrically conductive material lying on an electrode matrix or die. Electrode punch and electrode die are connected to opposite poles of a voltage source. As soon as the punch rivet has penetrated the first material and is in contact with the second electrically conductive material, a current flow through the punch rivet occurs. As the punch rivet is heated due to the current flow, the further joining process of the punch rivet is facilitated. As in the here described punch rivet method, hollow, half-hollow or solid rivets are used, the punch rivet drives waste material in front of it through the first electrically non-conductive material during its joining process. This waste material hinders an electrical contact between punch rivet and second material and thus the current flow through the punch rivet. Further, it is disadvantageous that the punch rivet penetrates the electrically non-conductive material in the cold state which leads to crack formation and other failure mechanisms especially in brittle plastics and similar materials.

DE 10 2010 020 569 A1 describes a thermal joining of a first electrically non-conductive component to a second electrically conductive component based on an electrical heating. To this end, first a joining auxiliary means consisting of an electrically conductive material is formed into the electrically non-conductive component. In an installation process prior to the connection method, the joining auxiliary means is fastened in the first component by means of rolling, stamping, die forming, pushing in, embossing or gluing. The joining auxiliary means provides the electrically conductive abutment contact for the subsequent electrical-thermal welding with the second component. For this purpose, the first component having the joining auxiliary means and the second component are positioned between an electrode punch and an electrode die which are arranged opposite to each other. An electrical current flow through the joining auxiliary means and the electrically conductive second component between electrode punch and electrode die leads to a welding between the joining auxiliary means and the second component at the boundaries abutting each other. Also, the thermal joining method described here has its disadvantages in that first of all, and in a prior method, an auxiliary joining means has to be fastened in the first component of electrically non-conductive material. Therefore, several steps of processing the auxiliary joining means and the first component are necessary at this point before the first component and the second component between electrode punch and electrode die may be connected to each other.

It is thus an object of the present invention to provide a less time consuming connection method between at least a component of non-weldable material and at least a component of weldable material compared to the prior art.

4. SUMMARY

The above-mentioned object is solved by the connection methods with a welding auxiliary joining part according to claims 1 and 2 and by means of at least a first component of a non- or poorly weldable material and at least a second component of weldable material or at least a second component having at least a portion of weldable material according to claim 19 which are connected to each other by means of a welding auxiliary joining part set therein. Preferred embodiments and developments of the present invention result from the description, the accompanying drawings as well as the appending claims.

The inventive connection method uses a welding auxiliary joining part to connect at least a first component without pre-punching of the at least one first component with at least a second component of weldable material or a portion of weldable material to each other. The inventive connection method comprises the following steps: driving of a welding auxiliary joining part into the at least one first component with a combined mechanical-thermal load of at least the welding auxiliary joining part, wherein preferably no waste material is separated from the at least one first component, deforming the welding auxiliary joining part under combined mechanical-thermal load at the at least one second component and welding the welding auxiliary joining part to the at least one second component so that the at least one first component and the at least one second component are connected to each other by means of the welding auxiliary joining part, wherein the connection method takes place continuously in a mechanical-thermal setting-welding-process.

By means of a stud-like welding auxiliary joining part consisting of weldable material, at least one first component and at least one second component are connected to each other based on a continuously proceeding mechanical-thermal setting-welding-process. During this connection method, which takes place continuously, mechanical forces are used for setting the welding auxiliary joining part into the at least one first component of weldable or non-weldable material. During this setting process, the welding auxiliary joining part is heated by means of an electrical current flow at least within the welding auxiliary joining part so that the heat amount produced here in the welding auxiliary joining part facilitates and supports the setting process of the welding auxiliary joining part into the at least one first component. The heat produced in the welding auxiliary joining part facilitates on the one hand the entering of the welding auxiliary joining part into the at least one first component. Further, this heat amount facilitates a deformation of the welding auxiliary joining part in the further process of the continuous mechanical-thermal setting-welding-process. The heat amount in the welding auxiliary joining part supports a compression of the welding auxiliary joining part in axial direction at the at least one second component so that an advantageous welding surface is formed at the interface between welding auxiliary joining part and the at least one second component.

By means of a preferred resistance stud welding or a resistance spot welding, the welding auxiliary joining part is welded to the at least one second component which consists of weldable material. As a result, the at least one first component and the at least one second component are connected to each other by means of the welding auxiliary joining part in a continuously proceeding mechanical-thermal setting-welding-process. Within this continuous connection method, it is not necessary that the welding auxiliary joining part is introduced in separate method steps, for example first into the first component or first into the second component. Further, it is remarkable that due to the current flow in the welding auxiliary joining part a warm pushing in of the welding auxiliary joining part into the at least one first component takes place. As this warm pushing in and compressing of the welding auxiliary joining part leads to a deformation of the welding auxiliary joining part within the at least one first component, preferably additional form- and/or force-fit connections between welding auxiliary joining part and the at least one first component result due to this deformation which support the connection to be produced.

The present invention further comprises a connection method with the aid of an electrically conductive welding auxiliary joining part to connect at least a first component of electrically conductive or non-conductive material without pre-punching of the at least one first component to at least a second component of weldable material or with a portion of weldable material. This connection method comprises the following steps: driving of the welding auxiliary joining part into the at least one first component with a combined mechanical-thermal load of at least the welding auxiliary joining part, wherein no waste material is separated from the at least one first component, deforming the welding auxiliary joining part under combined mechanical-thermal load at a die at an exit location out of the first component so that a welding head of the welding auxiliary joining part results, positioning the first component with welding auxiliary joining part and welding head on the at least one second component so that the welding head abuts the at least one second component, and welding the welding head of the welding auxiliary joining part to the at least one second component so that the at least one first component and the at least one second component are connected to each other by means of the welding auxiliary joining part.

The above described connection method is preferably designed as a discontinuously proceeding mechanical-thermal setting-welding-process. On this basis, it is possible that first of all, the welding auxiliary joining part is inserted into the at least one first component. Especially in case the at least one first component consists of a non- or poorly weldable material, the at least one first component is prepared in this way for a welding to the at least one second component of weldable material. After the welding auxiliary joining part has been provided in the at least one first component, it is preferably transported to the at least one second component and connected thereto by means of welding. As this connection method does not take place within a continuous mechanical-thermal setting-welding-process, the at least one first component is, based on the providing of the auxiliary joining part therein, prepared for a later fastening to the at least one second component, as for example a vehicle frame or a supporting structure, wherein the connecting to the at least one second component may thus take place at a later time so that also a transport of the at least one first component with welding auxiliary joining part, which is prepared for connecting, to another production or processing site is possible.

While the welding auxiliary joining part is driven into the at least one first component, it is on the one hand subject to a mechanical load, especially a joining force, and on the other hand to a thermal load, preferably an electric current heating at least the welding auxiliary joining part. Especially the additional thermal load supports the driving in of the welding auxiliary joining part compared to known punch rivet setting processes. During this driving in, the welding auxiliary joining part is deformed at the die opposite to a punch under simultaneous mechanical and thermal load, preferably compressed in axial direction of the welding auxiliary joining part. This compression takes place when the welding auxiliary joining part reaches the exit location out of the at least one first component during the driving in. As this exit location is blocked by means of the die, here a deforming of the welding auxiliary joining part takes place. The deforming leads at least to a radial enlargement and preferably to a flattening of the welding auxiliary joining part so that on the one hand a reliable hold of the welding auxiliary joining part in the at least one first component is supported and on the other hand, a welding head of the welding auxiliary joining part results due the flattening of the welding auxiliary joining part at the exit location. Generally, each contact surface of the welding auxiliary joining part which produces due to abutment at the at least one second component an electrical contact between welding auxiliary joining part and second component is understood as welding head. This electrical contact is the basis that the welding auxiliary joining part can be welded to the second component. As the welding head may have a different two dimensional extension, it is in some cases also denoted as weld spot. After the first component with the welding auxiliary joining part was provided with the welding head, it is preferably transported to the at least one second component for being welded thereto. The welding takes place by applying a mechanical-thermal load especially between welding auxiliary joining part and the at least one second component. As the welding auxiliary joining part is reliably connected to the at least one first component, a reliable connection of the at least one first and the second component takes place by means of this welding via the welding auxiliary joining part.

According to a preferred embodiment of the present invention, the welding auxiliary joining part is a stud heaving a head or at least a tip portion, at which a head diameter is larger than the maximum thickness of the tip portion. Further, it is preferred that, after completion of the continuous connection method, the stud abuts with an underside of a head facing into the direction of the at least one first component the at least one first component, or it is spaced therefrom. According to a further preferred embodiment of the present invention, the welding auxiliary joining part is a stud having a head, a head diameter of which does not exceed a maximum thickness of the tip portion. In this context, it is also preferred that the stud with the head is flush with the at least one first component or protrudes therefrom after completion of the continuous connection method.

As, depending on the material of the first component, material may be displaced against the joining direction during the setting of the welding auxiliary joining part into the at least one first component, the head of the welding auxiliary joining part comprises a circular groove for receiving a material deformation of the component adjacent to the head, preferably at a side facing the tip portion of the welding auxiliary joining part. Further, preferably different tip geometries of the welding auxiliary joining part are chosen for adapting the welding auxiliary joining part to the material of the components to be connected to each other. In this context, it is for example preferred that the welding auxiliary joining part has a tip portion with an ogival tip having an ogivality factor in the range of 1 to 10. According to another embodiment, the tip of the welding auxiliary joining part is designed conical, round, parabolic or in the shape of a pyramid. Depending on the materials which have to be connected to each other, one of the mentioned or another advantageous tip geometry of the welding auxiliary joining part is chosen to reduce the occurrence of failure mechanisms in the component materials.

As has been mentioned above already, the welding auxiliary joining part is formed in the shape of a stud of weldable material, as for example steel having a carbon equivalent of 0.2 to 0.8, preferably of 0.3 to 0.6. In materials science, the carbon equivalent (CEV) is a dimension for evaluating the welding suitability of unalloyed and low-alloyed steels. The carbon content and a plurality of other alloy elements in the steel influence its behavior. For evaluating the welding suitability, the carbon content and the weighted part of the elements influencing the welding suitability of the steel in a similar way as it has to be expected from the carbon, are summarized in the carbon equivalent to a numeric value. Preferably, this welding auxiliary joining part is suitable for setting by means of an increased setting speed, compared to the known methods, of >0.5 m/s to 5 m/s and preferably of 1 m/s to 4 m/s. This preferred setting speed is obtained due to the advantageous mechanical-thermal load of the welding auxiliary joining part during the driving in. In the same way it is also preferred to set the welding auxiliary joining part by means of known setting methods which are for example used for half-hollow punch rivets. For the different setting methods, it has been proven as specifically advantageous to form the stud without shank. The stud comprises a tip portion extending in longitudinal direction of the welding auxiliary joining part. The tip portion comprises a maximum thickness adjacent to the head or adjacent to a shank of the welding auxiliary joining part. At the end facing away from the head, the tip portion comprises a tip in the direction of which the tip portion tapers continuously or stepwise.

During the driving in, an advantageous material displacement takes place in the component of well, non- or poorly weldable material in radial direction with respect to the shank of the stud and in the portion of the tip of the shank based on the above-described tip geometry of the welding auxiliary joining part. A further advantage is that the welding auxiliary joining part may be mechanically deformed in its tip portion due to this shaping such that a welding head or welding spot is formed which is advantageous for the later welding of the welding auxiliary joining part. The welding head provides a reliable contact surface for resistance welding or arc welding at the welding auxiliary joining part. Therefore, in the following, even a welding spot being present only as plane is generally denoted and understood as welding head. An adaption to different material thicknesses of the at least one component of well, non- or poorly weldable material preferably takes place by means of a respective adaption of the length of the shank or the tip portion of the welding auxiliary joining part at unchanged tip geometry.

According to different preferred embodiments of the inventive welding auxiliary joining part, the head is in its diameter larger than or equal to a diameter of the shank or a maximum thickness of the tip portion of the welding auxiliary joining part. In case the head diameter is larger than the diameter of the shank or the maximum thickness of the tip portion, the circular groove for receiving a material displacement of a component adjacent to the head is preferably formed at the side of the head facing to the shank. In the same way, it is preferred to form rills or ribs instead of the circular groove or in combination with the circular groove which extend in radial direction to provide receiving spaces for receiving a material displacement of a component adjacent to the head.

For further providing a reliable connection between the welding auxiliary joining part and a component of non- or poorly weldable material, the shank of the welding auxiliary joining part is formed cylindrically, cylinder-like or at least partly conically. Cylinder-like also comprises a polygonal cross-sectional shape of the welding auxiliary joining part. According to a further preferred embodiment, an outer knurling or profiling of the shank of the welding auxiliary joining part supports the connection to the component of well, non- or poorly weldable material into which the welding auxiliary joining part has been set without pre-punching.

Further, it is preferred to form the tip portion of the welding auxiliary joining part with or without shank or with the conical or pyramid-shaped tip. In this context, it has been proven advantageous when the side surfaces of the tip enclose an angle with the longitudinal axis of the welding auxiliary joining part in the range of 5° to 60°, preferably of 15° to 40° and even more preferred of 20° to 30°.

According to a further preferred embodiment of the continuous and the discontinuous connection method, a compression of the welding auxiliary joining part takes place at a supporting component or the at least one second component of weldable material, respectively, or a die arranged at the exit location of the welding auxiliary joining part out of the at least one first component. As the welding auxiliary joining part is driven into the at least one first component by means of a mechanical-thermal load, the subsequent compression is supported by the heating of the welding auxiliary joining part which has already happened. According to a further preferred embodiment, which is described in detail below, the energy supplied to the welding auxiliary joining part leads, besides a warming of the auxiliary joining part, also to a warming of the at least one first component. This heating also supports the compression and deforming of the welding auxiliary joining part for the purpose of the desired connection so that a preferably large welding surface and later weld nugget is formed.

According to a further preferred embodiment of the present invention, the at least one first component consists of an electrically non-conductive material and the welding auxiliary joining part is driven in by means of an electrode punch and is guided by means of an electrode blank holder or downholder. In this context, electrode punch denotes a punch of known type for the driving in of punch rivets or welding auxiliary joining parts in general but which consist of an electrically conductive material and is connected to a voltage source. Electrode blank holder or downholder denotes a blank holder of known construction consisting of an electrically conductive material and being also connected to a voltage source. For supporting the inventive connection method, the electrode punch and the electrode blank holder have different electrical polarities so that via the welding auxiliary joining part between electrode punch and electrode blank holder, a current flows and heats the welding auxiliary joining part. For this purpose, it is also preferred and necessary that the electrode punch contacts the welding auxiliary joining part consisting of electrically conductive material but without being in electrical contact with the electrode blank holder. At the same time, the electrode blank holder contacts the welding auxiliary joining part so that an electrical current flow from the electrode punch to the electrode blank holder occurs via the welding auxiliary joining part. The heat produced thereby in the welding auxiliary joining part supports the driving in of the welding auxiliary joining part into the at least one first component but without softening the welding auxiliary joining part to an extent that a driving in is hindered.

According to a further preferred embodiment of the present invention, the at least one first component consists of an electrically conductive material and the welding auxiliary joining part is driven in by means of an electrode punch and guided by means of an electrode blank holder electrically insulated with respect to the welding auxiliary joining part.

While, in this preferred embodiment of the present invention, the welding auxiliary joining part is in electrical contact with the electrode punch, the electrode blank holder is in electrical contact with the at least one first component consisting of electrically conductive material. At the same time, the electrode blank holder is electrically insulated in a way that no contact to the welding auxiliary joining part exists. As the electrode punch and the electrode blank holder are connected to a voltage source and have a different polarity, an electrical current between the electrode punch and the electrode blank holder flows via the welding auxiliary joining part and the at least one first component. This current flow leads to a heating of the welding auxiliary joining part and the at least one first component, preferably in the joining zone adjacent to the welding auxiliary joining part. This heat supply facilitates preferably the driving in of the welding auxiliary joining part into the at least one first component.

Preferably, the at least one second component consists of an electrically conductive material in the above described preferred embodiments of the connection methods. As the at least one second component is supported at an electrode die having an electrical polarity opposite to that of the electrode punch, a current flows between electrode punch and electrode die via the welding auxiliary joining part and the second component.

Preferably, the current strength between electrode punch and electrode die is adjusted such that this current leads to a welding of the welding auxiliary joining part with the at least one second component at the interface between welding auxiliary joining part and second component.

The present invention further discloses at least a first component of a weldable or a non- or poorly weldable material and at least a second component of weldable material or having at least a portion of weldable material, especially a vehicle, which have been connected to each other by means of a mechanical-thermal setting-welding-process, especially by means of the above described connection methods, via a welding auxiliary joining part set into the at least one first component having a mechanically-thermally deformed tip portion.

5. BRIEF DESCRIPTION OF THE ACCOMPANYING DRAWINGS

The present invention is now explained in detail with reference to the accompanying drawings. It shows.

6. DETAILED DESCRIPTION

The present invention is related to the production of a reliable connection with high lifetime between at least a component 20 of non- or poorly weldable material and at least a component 30 of weldable material by means of welding (cf. FIGS. 6 to 11). The materials of the components 20 and 30 to be connected are not welding compatible to each other so that they are welded to each other indirectly by means of an inventively preferred welding auxiliary joining part 10. Steels and high strength steels, as for example 22MnB5 (CEV=0.5), B27 (CEV=0.54), 32MnCrB6 (CEV=0.6) from which beside others frame structures in the vehicle production are produced, have to be numbered among the weldable materials. Among the non- or poorly weldable materials, materials are understood which cannot or only poorly be welded to other components without constructive auxiliary means. These also include weldable materials which have, however, non- or only a poor welding compatibility in their material combination concerning the material of a component to be connected. This means that the in general weldable materials may be welded to each other not or only poorly or hardly, respectively. To these materials belong for example plastics, fibre-reinforced plastics, aluminum, cast iron or other cast alloys as well as steels, for example spring steels having a CEV>0.8.

For being able to connect the at least one component 20 of non- or poorly weldable material by means of welding at all, it is provided with the welding auxiliary joining part 10. The here described connection methods and the welding auxiliary joining part 10 are also applicable to components 20 of weldable or electrically conductive material and are comprised by the present invention. This welding auxiliary joining part 10 consists of weldable material and is anchored in the at least one component 20. Due to its material, the welding auxiliary joining part 10 is subsequently connectable to the at least one component 30 of weldable material by means of welding. In this way, a reliable connection between the components 20, 30 is produced by means of the welding auxiliary joining part 10.

It is also preferred to provide the at least one component 30 of non-weldable material. In this case, the at least one component 30 comprises a portion of weldable material which is formed preferably by a known welding auxiliary joining part or an inventively preferred welding auxiliary joining part 10 (not shown). For producing a connection between the at least one component 20 and the at least one component 30, the welding auxiliary joining parts preferably contained in both components 20, 30, respectively, are welded to each other, preferably by means of resistance welding or arc welding. This welding of the two welding auxiliary joining parts and thus of the two components 20, 30 takes place such that the welding heads or heads of the two welding auxiliary joining parts are brought into contact with each other and are then welded. Alternatively, a head of a welding auxiliary joining part is brought into contact with the welding head of the other welding auxiliary joining part and then welded to each other.

Preferred embodiments of the inventive welding auxiliary joining part 10 are shown in FIGS. 1 to 5. The welding auxiliary joining part 10 comprises a head 12 and preferably a shank 14. Further, the welding auxiliary joining part 10 comprises a tip portion 11 extending in longitudinal direction of the welding auxiliary joining part 10. The tip portion extends between a tip of the welding auxiliary joining part 10 and a point at which the tip portion has reached its maximum thickness D (cf. FIGS. 2 to 4).

According to different embodiments of the present invention, the tip portion 11 has different shapes. In a side view, the tip portion is formed conically or pyramid-shaped or parabolic. It is further preferred to form the surface area, which is symmetrical with respect to the longitudinal axis of the tip portion, convexly or concavely or polygonally. It has to be understood that the above described embodiments of the tip portion 11 are usable in combination with the head 12 or in combination with the head 12 and the shank 14.

The head 12 of the welding auxiliary joining part 10 comprises a head diameter which is either larger than or equal to a diameter of the shank 14 or to the maximum thickness D of the tip portion 11. According to the embodiments of FIGS. 1 and 2, the head diameter is larger than the shank diameter or the maximum thickness D. After the welding auxiliary joining part 10 has been set into the at least one component 20 of non- or poorly weldable material, the underside of the head 12 facing the shank 14 or the tip portion 11 abuts the component 20 or is spaced therefrom. This means that the welding auxiliary joining part 10 has been set into the at least one component 20 with a specific head distance or head protrusion.

The underside of the head 12 comprises preferably an underhead groove 16 circumferentially extending around the shank 14 or the tip portion 11. This underhead groove 16 serves for receiving the material which is displaced from the at least one component 20 adjacent to the head 12.

Also preferably, the head underside of the head 12 comprises additionally to or instead of the underhead groove 16 ribs and/or recesses or rills, respectively, extending in radial direction. The recesses or rills, respectively, (not shown) and the ribs (not shown) define cavities in which displaced material from the component 20 is receivable. These cavities ensure an ideal abutment of the head 12 on the component 20 despite of the material displacement from the component 20. Further, these cavities form an undercut against a rotation of the welding auxiliary joining part 10 in the at least one component 20.

Figure 4:
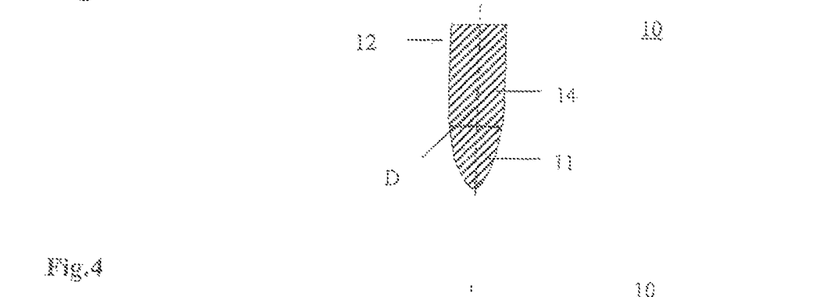
Figure 5:
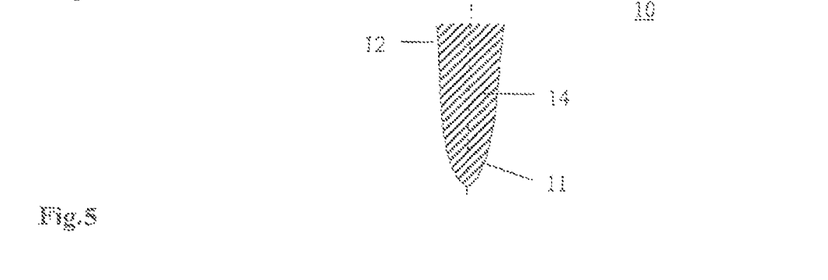

According to a further preferred embodiment of the inventive welding auxiliary joining part 10, the head diameter of the head 12 is equal to the shank diameter of the shank 14 or to the maximum thickness D of the tip portion as it is exemplarily shown in FIGS. 4 and 5.

Figure 1:
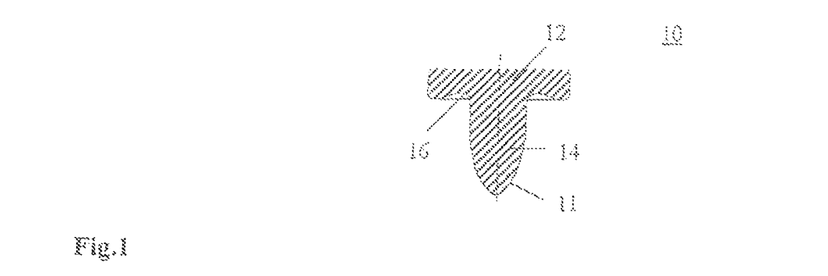
FIG. 1 a preferred embodiment of the welding auxiliary joining part according to the present invention, FIG. 2 a further preferred embodiment of the welding auxiliary joining part according to the present invention, FIG. 3 a further preferred embodiment of the welding auxiliary joining part according to the present invention, FIG. 4 a further preferred embodiment of the welding auxiliary joining part according to the present invention, FIG. 5 a further preferred embodiment of the welding auxiliary joining part according to the present invention, FIG. 6 a schematic depiction of a preferred embodiment of a first stage of an inventive connection method, FIG. 7 a schematic depiction of a further preferred embodiment of the first stage of the inventive connection method, FIG. 8 a schematic depiction of a further preferred embodiment of the first stage of the inventive connection methods, FIG. 9 a schematic depiction of a preferred embodiment of a second stage of the inventively preferred connection methods according to FIG. 6, 7 or 8, FIG. 10 a schematic depiction of a preferred embodiment of an inventive continuous connection method, and FIG. 11 a schematic depiction of a further preferred embodiment of an inventive continuous connection method.
Figure 2:
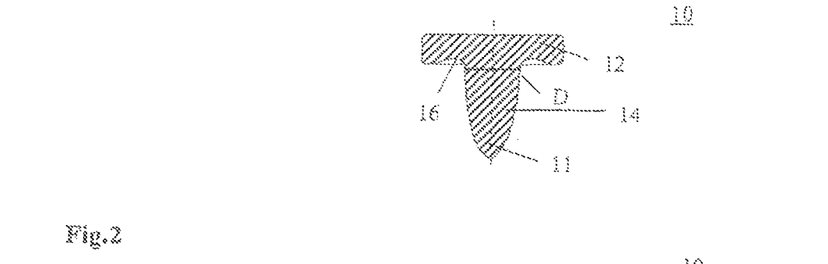
Figure 3:
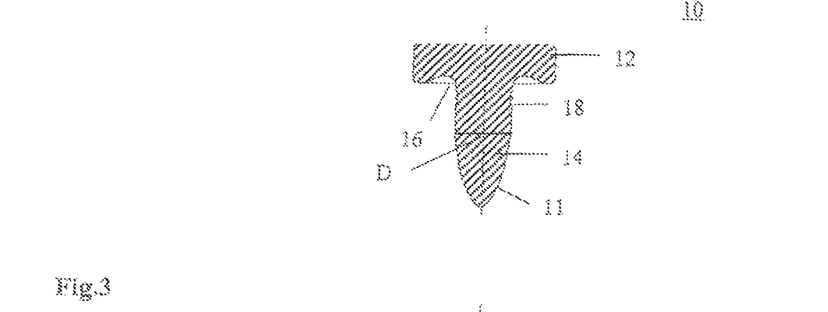

For the different embodiments of the welding auxiliary joining part 10, it is also preferred to provide the shank 14 cylindrically (cf. FIG. 1, 3, 4), conically (cf. FIGS. 2 and 5) as well as with or without outer knurling 18 (cf. FIG. 3).

According to a further preferred embodiment of the present invention, a tip of the shank 14 has preferably an ogival shape having an ogivality factor in the range of 1 to 20, further preferred with an ogivality factor in the range of 3 to 5. It is also preferred that the tip in its longitudinal cross-section comprises a parabolic shape or is designed conically or pyramid-shaped. According to a further preferred embodiment, the surface area of the tip portion 11 encloses an angle with the longitudinal axis of the welding auxiliary joining part 10 in the range of 5° to 60°.

The above described welding auxiliary joining part 10 is used for connecting the at least one component 20 of non- or poorly weldable material or of weldable or electrically conductive material, respectively, with the at least one component 30 of weldable material. Alternatively, it is also preferred to provide the at least one component 30 of non-weldable material with a welding auxiliary joining part 10 so that the at least one component 20 and the at least one component 30 are connected to each other by means of their welding auxiliary joining parts.

Figure 9:
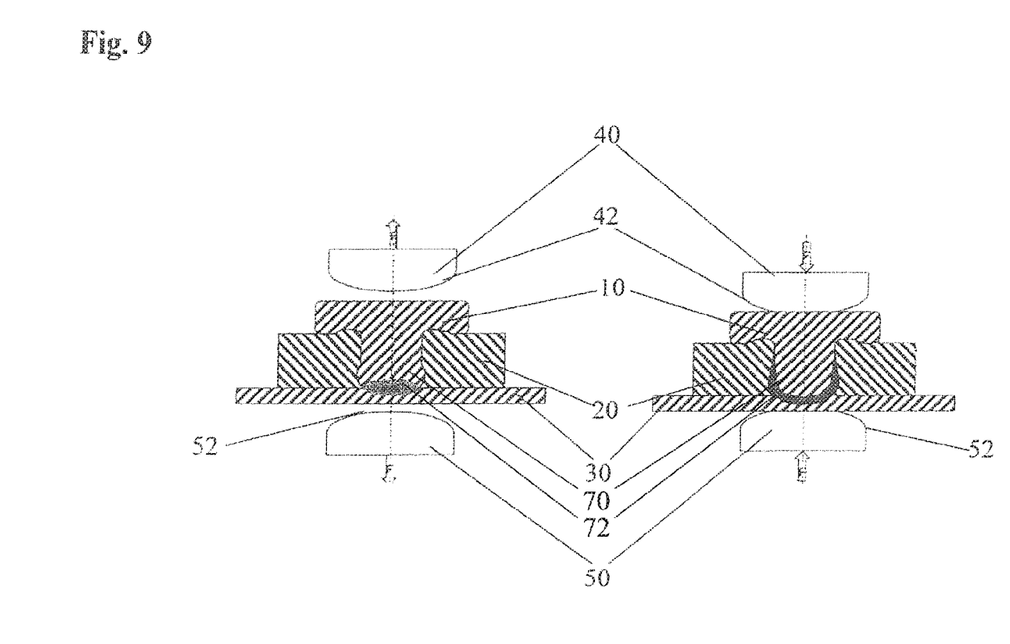
Figure 10:
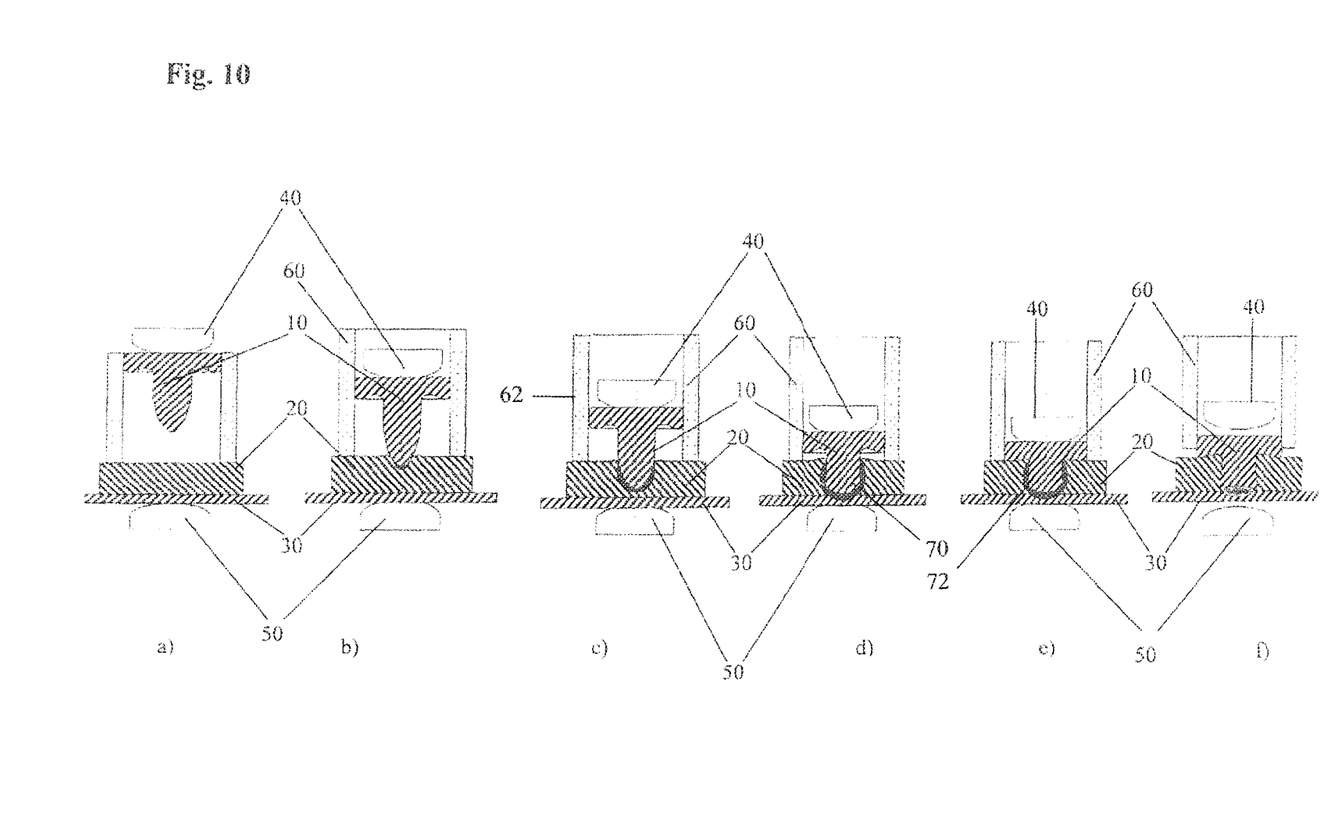
Figure 11:
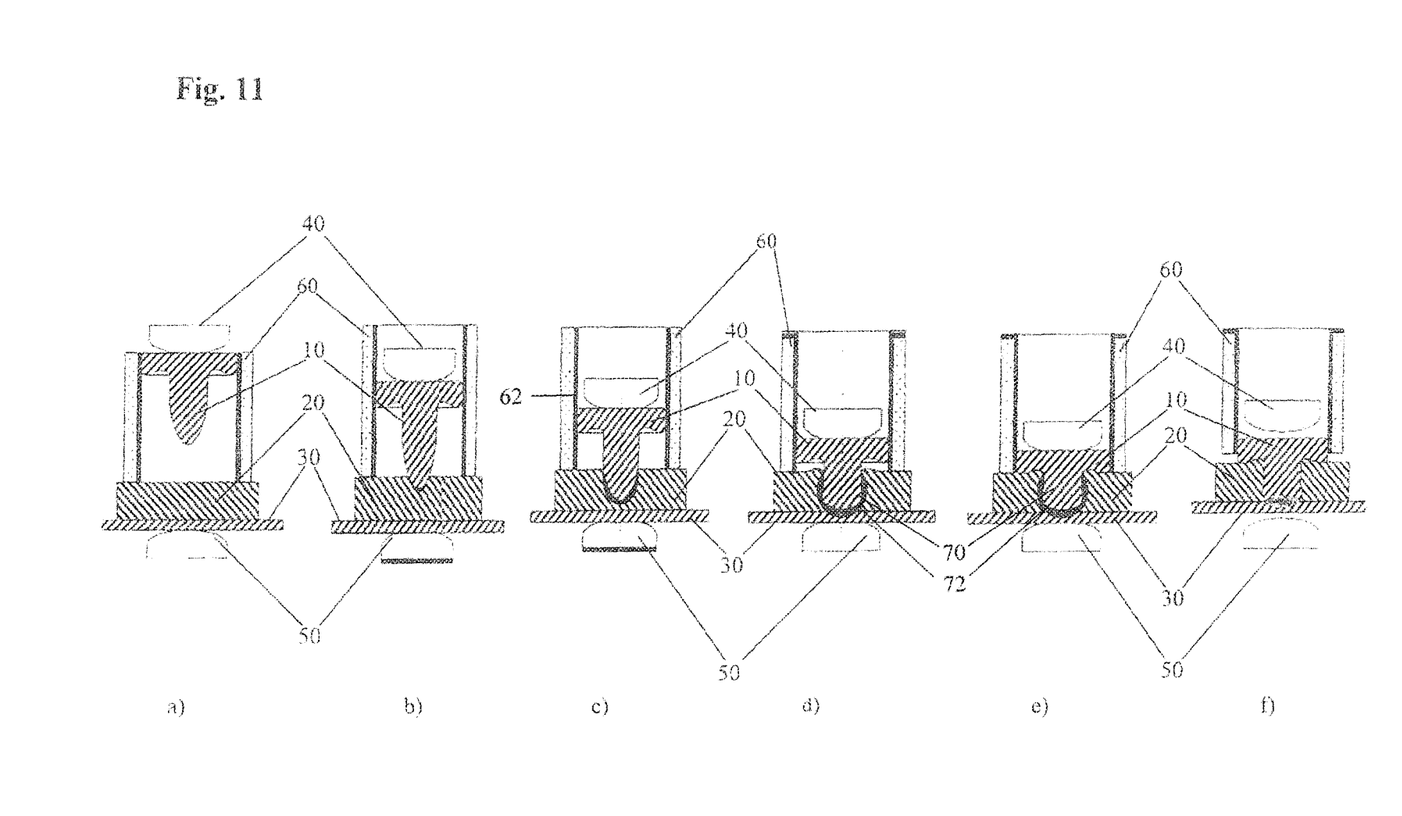

According to a first inventive method alternative, this connection method consists of a setting method and a welding method which are performable locally and timely separated from each other (cf. FIGS. 6-8 and 9) or which are performable in a sequence at one place (cf. FIGS. 10 and 11). The setting method comprises withal the setting or driving in (S1), respectively, of the welding auxiliary joining part 10 into the at least one first component 20, wherein the at least one first component 20 is not pre-punched. The welding auxiliary joining part 10 is thus driven into the at least one first component 20 such that no waste material, as for example a punch or waste slug or the like, occurs. This prevents the waste material from having to be removed. Further, the waste material is thus prevented from being accumulated at or near a welding spot or welding head and thus from affecting the welding connection to be produced during the welding negatively.

During the driving in (S1), the joining energy supplied to the welding auxiliary joining part 10 is adjustable such that the welding auxiliary joining part 10 is driven in with (S2) or without protrusion of the head (S3). The driving in with and without protrusion of the head is applicable to the welding auxiliary joining part 10 with and without head in the same way. The protrusion of the head preferably ensures the supply of additional material to the welding location during the later welding (see below).

Figure 6:
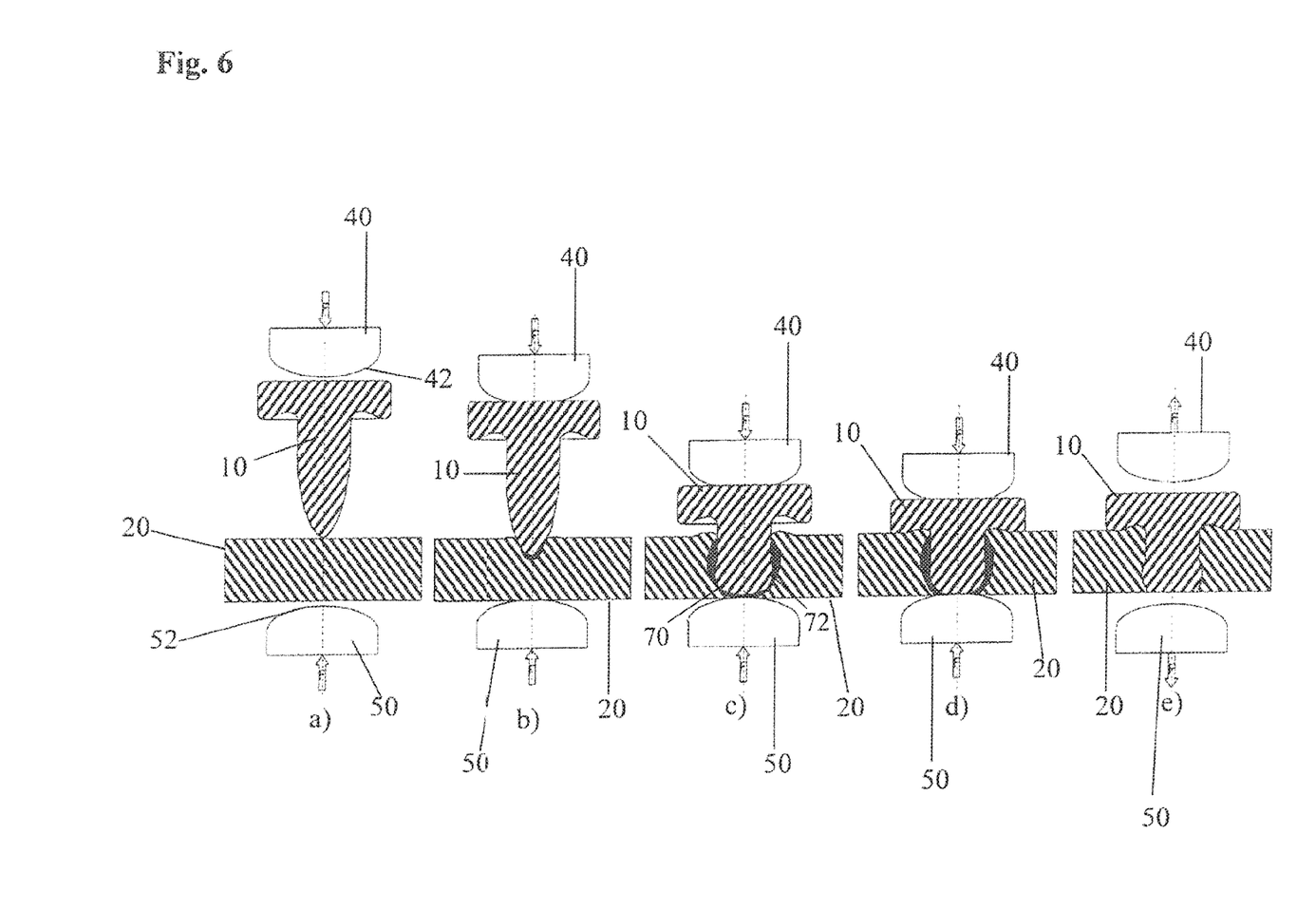

FIG. 6 illustrates schematically a first stage of the inventively preferred connection method comprising the preferred driving in (S1) of the welding auxiliary joining part 10 into one or several components 20 of non- or poorly or well weldable material. The connecting method serves for the connection of at least a first component 20 to at least a second component 30. The second component 30 consists of a weldable or electrically conductive material, as for example steel, aluminum and similar materials, as described above.

The first component 20 is produced from a non- or poorly weldable or a non- or poorly electrically conductive material, respectively, or from a weldable or electrically conductive material. In the further text, the term "weldable" is equal to "electrically conductive" and the term "non- or poorly weldable" is equal to "non- or poorly electrically conductive". Depending on the choice of materials of the components 20, 30, different preferred alternatives of the connection method result.

When in the present description it is referred to one component 20 and one component 30, this means at the same time the possibility of a plurality of components 20 and components 30.

The different embodiments of the inventive connection method described in the following use generally a combined mechanical and thermal load for driving in the welding auxiliary joining part 10 into the at least one first component 20. The mechanical load is applied by a punch, preferably an electrode punch 40, on the welding auxiliary joining part 10 as it is generally known from setting methods for punch rivets. Additionally to the mechanical load, the welding auxiliary joining part 10 is heated during the driving in into the at least one first component 20. This thermal load supports or facilitates a deformability of the welding auxiliary joining part 10 and/or the at least one first component 20 without worsening its joining characteristics. Further, the welding auxiliary joining part 10 gives off heat to the adjacent portions of the component 20 whereby the driving in of the welding auxiliary joining part into the component 20 is facilitated. The thermal energy or heat in the welding auxiliary joining part 10 is created by means of an electrical current flow in the welding auxiliary joining part 10.

According to different method alternatives, this current flow is guided solely through the welding auxiliary joining part 10 or through the welding auxiliary joining part 10 and the component 20 for heating them. Depending on the current strength and the length of the current flow, the welding auxiliary joining part 10 and/or the component 20 are specifically heatable, wherein also different dimensions and material compositions of component 20 and welding auxiliary joining part 10 may be considered.

FIGS. 6 and 9 illustrate two stages of a preferred embodiment of an inventive connection method at which in a first stage the welding auxiliary joining part 10 is first of all driven into the component 20 under combined mechanical and thermal load. The mechanical load is applied by the electrode punch 40 in the form of a pressure force onto the welding auxiliary joining part 10. The electrode punch 40 has the functionality of punches of known setting devices. Additionally thereto, a punch surface 42 being in contact with the welding auxiliary joining part 10 is provided electrically conductive. As the electrode punch 40 is connected to a voltage source (not shown) of specific electrical polarity, this electrical polarity and the potential of the voltage source is transferred to the electrode punch 40 and via the punch surface 42 to the electrically conductive welding auxiliary joining part 10.

According to the preferred embodiment shown in FIG. 6, the component 20 consists of an electrically conductive material and is supported at an electrode die 50. The electrode die 50 has the same characteristics and functions as known dies of setting devices. Additionally thereto, a die surface 52, which is in contact with the component 20, is provided electrically conductive. As the electrode die 50 is connected to a voltage source (not shown) of specific electrical polarity and of specific electrical potential, this electrical polarity and the electrical potential is transferred from the electrode die 50 via the electrode die surface 52 to the electrically conductive component 20.

For creating a thermal load at least in the welding auxiliary joining part 10—thus for heating the welding auxiliary joining part 10—a current flow is created in the welding auxiliary joining part 10. For this purpose, the electrode punch 40 and the electrode die 50 are connected to an electrical voltage or current source, respectively, of different electrical polarity. As soon as the punch surface 42 contacts the welding auxiliary joining part 10 and the die surface 52 contacts the electrically conductive component 20, an electrical current flows through the welding auxiliary joining part 10 and the component 20. Due to the strength of the current flow, the welding auxiliary joining part 10 and preferably also the component 20 are heated such that the driving in of the welding auxiliary joining part 10 into the component 20 is supported and facilitated.

According to the sequential depictions in the FIG. 6a-d, the welding auxiliary joining part 10 is driven in by the mechanical load evermore into the component 20. The supplied thermal energy supports a deformation of the welding auxiliary joining part 10 so that the shank of the welding auxiliary joining part 10 is preferably radially enlarged. As further preferred also a part of the heat of the welding auxiliary joining part 10 is transferred to the component 20, this supports a material displacement against the joining direction of the welding auxiliary joining part 10 as it is indicated in FIG. 6c, d. In this manner, the material flow in component 20 against the joining direction of the welding auxiliary joining part 10 is supported so that preferably a circular underhead groove of the welding auxiliary joining part 10 is filled with a material bulge of displaced material.

Further, the tip of the welding auxiliary joining part 10 meets the electrode die 50 at an exit location out of the component 20 and is deformed there and is especially compressed. The compression leads to a lateral widening of the welding auxiliary joining part 10 so that a welding head 70 of the welding auxiliary joining part 10 is formed at the exit location out of the component 20. As soon as the head of the welding auxiliary joining part 10 abuts the component 20 or a defined head protrusion with respect to the component 20 has been produced, the electrode punch 40 and the electrode die 50 are removed from the welding auxiliary joining part 10. Thus, no current flows through the welding auxiliary joining part 10 any longer and the welding auxiliary joining part 10 as well as the component 20 cool down. It is also preferred to switch off the electrode punch 40 and/or the electrode die 50 electrically already earlier so that no heat is created anymore in the welding auxiliary joining part 10. The switching off occurs preferably as soon as the welding auxiliary joining part 10 contacts the electrode die 50.

During the driving in of the welding auxiliary joining part it has been recognized that material of the component 20 is possibly moved in front of the later welding head 20. For avoiding that the displaced material of the component 20 hinders the later welding and thus the contact between welding head 70 and the further component 30, preferably these material residues (not shown) are burned or blasted away at the welding head 70. This cleaning of the welding head 70 occurs with a cleaning current pulse which creates a current flow of sufficient current strength through the welding auxiliary joining part 10. The current strength of this current flow has to be large enough that the material residues at the welding head 70 cannot resist the thermal load due to this current flow. It is further conceivable that the material residues at the welding head 70 can be removed by a high-frequent voltage. It has to be understood that such cleaning current pulses can be created in the welding auxiliary joining part 10 only if an electrical contact between electrode punch 40, welding auxiliary joining part 10 and electrode die 50 is present (cf. FIG. 6d).

The already above-mentioned welding head 70 provides a free welding surface 72 to contact the further component 30 for a later welding method (see below).

It follows from the above that the welding auxiliary joining part 10 is driven in by means of a combined mechanical and thermal load, wherein especially the heat produced by the supplied electrical energy in the welding auxiliary joining part 10 and preferably in the component 20 supports and facilitates the driving in. In this way, and according to a further preferred embodiment, driving in speeds of the welding auxiliary joining part 10 of >0.5 m/s to 5 m/s and preferably of 1 m/s to 4 m/s are achieved which shorten the whole connection process in an effective way.

Figure 7:
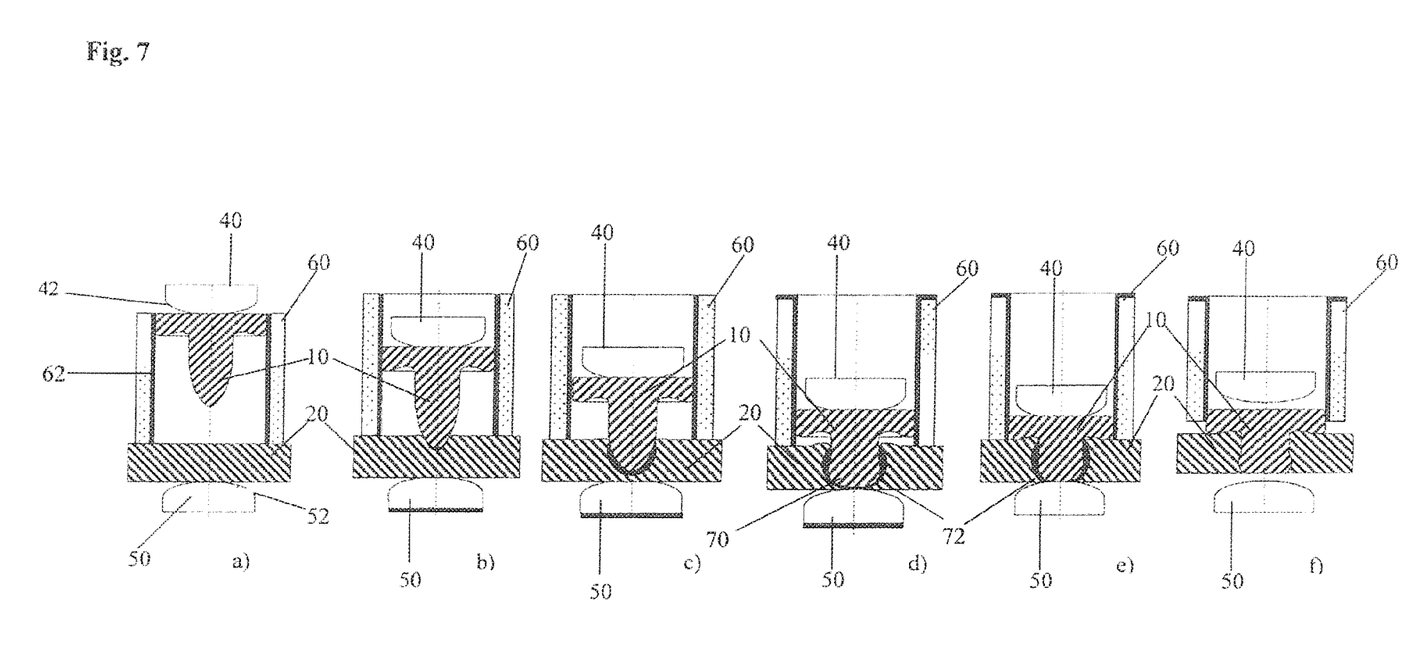

According to a further preferred embodiment of the first stage of the above described connection method, an electrode blank holder 60 is used for holding the component 20, for simultaneously electrically contacting the component 20 and for driving in the welding auxiliary joining part 10 (cf. FIG. 7). The electrode blank holder 60 is connected to an electrical voltage or current source (not shown). Further, the electrode blank holder 60 is insulated at its radial inner side 62 with respect to the welding auxiliary joining part 10. Preferably, the electrode blank holder 60 has the same electrical polarity as the electrode die 50 and the opposite electrical polarity as the electrode punch 40.

Further, it is preferred and also applicable in the above described embodiments that the electrode blank holder 60 consists of an electrically well conductive material. This ensures that the current flowing in the electrode blank holder 60 is limited and provides for a low heat generation. As a heating of the electrode blank holder 60 may lead to a damage of the component 20, it is also preferred to cool the electrode blank holder 60. This preferably prevents also a pressing in of the electrode blank holder 60 into the component 20.

The electrode punch 40 drives the welding auxiliary joining part 10 in the direction of the component 20 which consists of an electrically conductive material. As long as the welding auxiliary joining part 10 does not abut the component 20, no electrical current flows through the welding auxiliary joining part 10 (cf. FIG. 7*a*). According to a preferred embodiment, the electrode blank holder 60 and the electrode die 50 with opposite electrical polarity are connected to the component 20 so that a heating up electrical current flows through the component 20. This current flow heats the welding auxiliary joining part 10 as well as the component 20 within a joining zone below the electrode punch 40.

At the time the welding auxiliary joining part 10 abuts the component 20, the electrode die 50 is electrically insulated with respect to the component 20 or electrically switched off which is stressed by the lower black line at the electrode die 50. As the electrode punch 40 and the electrode blank holder 60 have different electrical polarities, a current flows between the electrode blank holder 60 and the electrode punch 40 via the welding auxiliary joining part 10 and the component 20. This current flow heats the welding auxiliary joining part 10 as well as the component 20 within a joining zone below the electrode punch 40.

As the electrode blank holder 60 prevents on the one hand preferably an ascending of displaced material of the component 20, it allows a heating of the component 20 in the joining zone. This heating has a greater lateral extension than in the embodiment according to FIG. 6 as the current flows out of the shank of the welding auxiliary joining part 10 to the electrode blank holder 60 and thereby heats the component 20.

As soon as the welding auxiliary joining part 10 contacts the electrode die 50, the electrode die 50 is electrically connected (cf. FIG. 7*c, d*). At the same time, the electrode blank holder 60 is electrically switched off which is illustrated by the black lines at the upper side of the electrode blank holder 60. It is certainly also preferred to let the electrode blank holder 60 connected in addition to the electrode die 50 for amplifying or intensifying the current flow and/or for distributing it in the component 20.

In the driving in conditions according to FIGS. 7*d* and *e*, a heating and compressing of the welding auxiliary joining part 10 happens in the same way as it was described above with reference to FIG. 6. In this way, the desired welding head 70 with the later used welding surface 72 is produced. By the compression and lateral widening of the welding auxiliary joining part 10, it locks preferably in the component 20 which supports the stability of the connection to be produced.

Figure 8:
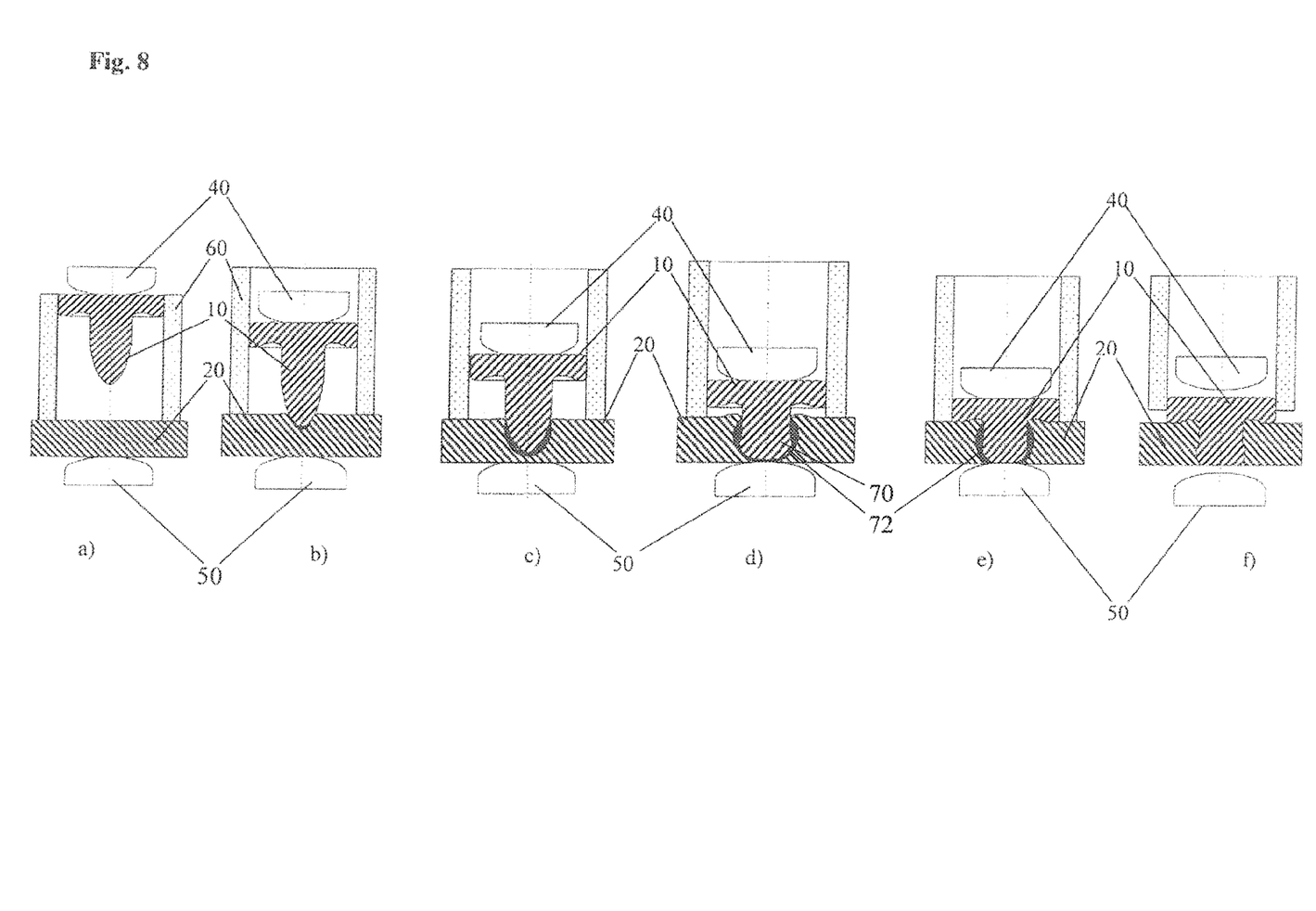

FIG. 8 illustrates schematically the preferred driving in of the welding auxiliary joining part 10 into the component 20 consisting of electrically non- or poorly conductive material. While the mechanical load is applied to the welding auxiliary joining part 10 via the electrode punch 40, the welding auxiliary joining part 10 is heated preferably prior to or during the driving in into the component 20 by electrical current flow. For this purpose, the electrode punch 40 and the electrode blank holder 60 have different electrical polarities, wherein they are connected to each other via the electrically conductive welding auxiliary joining part 10. The current flow via the welding auxiliary joining part 10 between electrode punch 40 and electrode blank holder 60 heats the welding auxiliary joining part 10 (cf. FIG. 8*a*) and preferably the component 20 during the driving in of the welding auxiliary joining part 10 into the component 20.

During the driving in of the welding auxiliary joining part 10 into the component 20, the welding auxiliary joining part 10 is deformed as it has been discussed above already. This deforming comprises an arbitrary deforming, as for example distorting or bending of the welding auxiliary joining part 10 within the component 20. Further, the deforming comprises preferably the compressing at the electrode die 50 or at a further component 30 which leads to a lateral widening of the welding auxiliary joining part 10 transversely to its longitudinal axis. The deforming also comprises a flowing of the welding auxiliary joining part 10 within the component 20 and/or by the heat supply and/or for reducing mechanical tensions in component 20. This deforming occurs in all embodiments of the present invention, even if it is not explicitly mentioned.

As soon as the welding auxiliary joining part 10 meets the electrode die 50, the welding auxiliary joining part 10 is compressed. In this way, the welding head 70 with welding surface 72 is created (cf. FIG. 8*d*). Preferably, the driving in and compressing of the welding auxiliary joining part 10 is continued until the head of the welding auxiliary joining part 10 abuts the component 20. Subsequently, the component 20 with welding auxiliary joining part 10 cools down and the electrode punch 40, the electrode blank holder 60 and the electrode die 50 are removed.

From the above described preferred embodiments of the thermal-mechanical setting process according to FIGS. 6, 7 and 8, the component 20 with welding auxiliary joining part 10 results which can now be welded to the further component 30. Therefore, and according to FIG. 9, the component 20 with welding auxiliary joining part 10 is positioned on the component 30 which consists of weldable material. Now, the two components 20, 30 are pressed against each other by means of the electrode punch 40 and the electrode die 50 for producing a sufficient electrical contact between the welding surface 72 of the welding auxiliary joining part 10 and the component 30. Thereafter, the electrode punch 40 and the electrode die 50 with different electrical polarity are connected so that a sufficient welding current flows between electrode punch 40 and electrode die 50 via the welding auxiliary joining part and the component 30. In the portion of the welding head 70 with welding surface 72, a structure transformation occurs due to the current flow and the heating related thereto at the interface between welding surface 72 and component 30 which connects the welding auxiliary joining part 10 to the component 30. After the current flow has been switched off, the connection produced cools down. It is preferred to supply additional electrical energy or heat during the here used resistance welding by setting the electrical blank holder 60 onto an electrically conductive component 20.

As can be seen based on the already above-described embodiments, the present invention is characterized by varying the mechanical and the thermal load of the welding auxiliary joining part 10 specifically. Thus, preferably the thermal load, and thus the heat, in the welding auxiliary joining part 10 and preferably in component 20 and/or component 30 is changed by the electrode punch 40 in coordination with the applied force. Preferably, at a higher thermal load, a lower joining force of the electrode punch 40 is required. Further, preferably the joining force of the electrode punch 40 is increased in case a lowering of the heat in the welding auxiliary joining part 10 and/or in component 20/30 should be necessary. Further, mechanical and thermal loads may be increased or decreased at the same time.

Especially the achieved heat generation in the welding auxiliary joining part 10 and/or in the components 20/30 is ensured preferably by the electrical switching possibilities between the electrode punch 40, electrode die 50 and electrode blank holder 60. In this regard, it is possible to switch on and off the individual electrodes specifically, to change their polarity and to vary also the electrical voltage supplied thereto.

In this way, preferably the current flow is specifically guided: a) from the electrode punch 40 via the welding auxiliary joining part 10 and the component 20 into the electrode die 50 (cf. FIG. 6a), or b) from the electrode punch 40 via the welding auxiliary joining part 10 and the component 20 into the electrode blank holder 60 (cf. FIG. 7d), or c) from the electrode blank holder 60 via the component 20 into the electrode die 50 (cf. FIG. 7a), or d) from the electrode punch 40 over the welding auxiliary joining part 10 and the component 20 as well as from the electrode blank holder 60 via the component 20 into the electrode die 50, or e) from the electrode punch 40 via the welding auxiliary joining part 10 into the electrode blank holder 60 (cf. FIG. 8d).

Within the same connection method, despite of the embodiments of the present invention, it is preferably switched between the above described connection configurations for specifically loading specific portions of the components 20, 30 to be connected as well as the welding auxiliary joining part 10 thermally.

The present invention further comprises a continuously proceeding mechanical-thermal welding-setting-process at which the components 20, 30 are connected to each other by means of the welding auxiliary joining part 10 in a continuously proceeding connection method. Two preferred embodiments of this continuous connection method are schematically illustrated in FIGS. 10 and 11. The embodiment of FIG. 10 is comprised of the method alternatives according to FIGS. 8 and 9 which now take place coherently. The embodiment of FIG. 11 is comprised of the method alternatives according to FIGS. 7 and 9 which now take place in combination.

As the component 20 is positioned in the embodiments of FIGS. 10 and 11 on the electrically conductive component 30 before the driving in of the welding auxiliary joining part 10 into the component 20 starts, the description of the preferred embodiments of the FIGS. 8 and 7 is applicable analogously to the embodiments of FIGS. 10 and 11. The electrically conductive component 30 provides in the same way an electrically conductive surface as the electrode die 50 before, which comprises the respective electrical polarity of the electrode die 50.

In contrast to the embodiments of FIGS. 8 and 7, subsequently to the driving in of the welding auxiliary joining part 10 into the component 20 and the forming of the welding head 70 with the welding surface 72, the welding connection between welding auxiliary joining part 10 and component 30 is produced. Preferably, the forming of the welding head 70 with welding surface 72 and the welding merge into each other so that the continuous connection method takes place more time-efficiently. Further, it is not necessary to cool the arrangement of welding auxiliary joining part 10 and component 20 and to remove it from the electrode punch 40 and the electrode die 50. Further, it is advantageous that the already above described driving in speeds of the welding auxiliary joining part 10 can be achieved by means of the combined mechanical and thermal loads.

The invention claimed is:

1. Preparation method of only one first component or a plurality of first components of electrically conductive or non-conductive material by providing a welding auxiliary joining part therein to a later fastening to at least a second component of weldable material or having a portion of weldable material by a later welding of the welding auxiliary joining part to the at least one second component, wherein the preparation method comprises the following steps:
   a. driving of the welding auxiliary joining part into the only one first component or the plurality of first components with a combined mechanical-thermal load acting on at least the welding auxiliary joining part, wherein no waste material is separated from the only one first component or the plurality of first components, and
   b. deforming the welding auxiliary joining part under combined mechanical-thermal load at a die at an exit location out of the only one first component or out of the plurality of first components so that a weld head of the welding auxiliary joining part is created,
   c1. the only one first component or the plurality of first components consists of an electrically non-conductive material and the welding auxiliary joining part is driven in by an electrode punch and is guided by an electrode blank holder, wherein the electrode punch and the electrode blank holder have different electrical polarities so that a current flows between electrode punch and electrode blank holder via the welding auxiliary joining part which heats at least the welding auxiliary joining part, or
   c2. the only one first component or the plurality of first components consists of an electrically conductive material and the welding auxiliary joining part is driven in by an electrode punch and is guided by an electrode blank holder which is electrically insulated with respect to the welding auxiliary joining part, wherein a supporting electrode die is electrically insulated.

2. The preparation method according to claim 1, wherein the welding auxiliary joining part is a stud having at least a tip portion, in which a head diameter is larger than a maximum thickness of the tip portion, or wherein the welding auxiliary joining part is a stud having a head, in which a head diameter does not exceed a maximum thickness of the tip portion.

3. The preparation method according to claim 1, wherein the welding auxiliary joining part is a stud having a head and a tip portion, in which a head diameter is larger than a maximum thickness of the tip portion, and the head of the welding auxiliary joining part has a circular groove at a side facing the tip portion for receiving a material deformation of a component adjacent to the head.

4. The preparation method according to claim 1, wherein the welding auxiliary joining part is a stud having a head and a tip portion, in which a head diameter is larger than a maximum thickness of the tip portion, and the tip portion has an ogival tip having an ogivality factor in the range of 1 to 10 or a conical, a round, a parabolic or a pyramid-shaped design.

5. The preparation method according to claim 1, wherein the driving in by the mechanical-thermal load accelerates the welding auxiliary joining part up to a speed in the range of >0.5 m/s to 5 m/s.

6. The preparation method according to claim 1, further comprising:
   compressing the welding auxiliary joining part at the die which is arranged at the exit location of the welding auxiliary joining part out of the only one first component or out of the plurality of first components.

7. The preparation method according to claim 1, wherein in alternative c2 the electrode punch and the electrode blank holder have different polarities so that a current flows between the electrode punch and the electrode blank holder via the welding auxiliary joining part and the only one first component or the plurality of first components, and heats at least the welding auxiliary joining part.

8. A discontinuously proceeding mechanical-thermal setting-welding method by a welding auxiliary joining part for connecting only one first component or a plurality of first components without pre-punching the only one first component or the plurality of first components with at least one second component of weldable material or having a portion of weldable material, wherein the setting-welding method is separated into a preparation phase of the only one first component or the plurality of first components to a connecting with the at least one second component and a fastening phase of the only one first component or the plurality of first components at the at least one second component, and the fastening phase takes place at a later time compared to the preparation phase, wherein the discontinuously proceeding mechanical-thermal setting-welding method comprises the following steps:
  a. driving of the welding auxiliary joining part into the only one first component or the plurality of first components by a combined mechanical-thermal load of at least the welding auxiliary joining part, wherein no waste material is separated from the only one first component or the plurality of first components,
  b. deforming the welding auxiliary joining part under combined mechanical-thermal load at a die at an exit location out of the only one first component or the plurality of first components so that a weld head of the welding auxiliary joining part is created, wherein
  c1. the only one first component or the plurality of first components consists of an electrically non-conductive material and the welding auxiliary joining part is driven in by an electrode punch and is guided by an electrode blank holder, wherein the electrode punch and the electrode blank holder have different electrical polarities so that a current flows between electrode punch and electrode blank holder via the welding auxiliary joining part which heats at least the welding auxiliary joining part, or
  c2. the only one first component or the plurality of first components consists of an electrically conductive material and the welding auxiliary joining part is driven in by an electrode punch and is guided by an electrode blank holder which is electrically insulated with respect to the welding auxiliary joining part, wherein a supporting electrode die is electrically insulated
  d. positioning of the only one first component or the plurality of first components with welding auxiliary joining part and welding head on the at least one second component so that the welding head abuts at the at least one second component, and
  e. welding the welding head of the welding auxiliary joining part to the at least one second component so that the only one first component or the plurality of first components and the at least one second component are connected to each other by the welding auxiliary joining part.

9. The setting-welding method according to claim 8, wherein the only one first component or the plurality of first components and the at least one second component are welded by resistance stud welding or resistance spot welding.

10. The setting-welding method according to claim 8, wherein the welding auxiliary joining part is a stud having at least a tip portion, in which a head diameter is larger than a maximum thickness of the tip portion and wherein the stud abuts with a head underside facing the only one first component or the plurality of first components after completion of the connection method, or is spaced therefrom.

11. The setting-welding method according to claim 8, wherein the welding auxiliary joining part is a stud having a head, in which a head diameter does not exceed a maximum thickness of the tip portion, and wherein the stud with the head is flush with the only one first component or the plurality of first components or protrudes therefrom after completion of the connection method.

12. The setting-welding method according to claim 10, wherein the head of the welding auxiliary joining part has a circular groove at a side facing the tip portion for receiving a material deformation of a component adjacent to the head.

13. The setting-welding-method according to claim 10, wherein the tip portion has an ogival tip having an ogivality factor in the range of 1 to 10 or a conical, a round, a parabolic or a pyramid-shaped design.

14. The setting-welding method according to claim 8, wherein the driving in by the mechanical-thermal load accelerates the welding auxiliary joining part up to a speed in the range of >0.5 m/s to 5 m/s, preferably 1 m/s to 4 m/s.

15. The setting-welding method according to claim 8, comprising:
  compressing the welding auxiliary joining part at the die which is arranged at the exit location of the welding auxiliary joining part out of the only one first component or the plurality of first components.

* * * * *